United States Patent [19]

Dame et al.

[11] Patent Number: 5,737,391
[45] Date of Patent: Apr. 7, 1998

[54] ALARM SYSTEM BACKUP WITH CUT LINE DETECTOR

[75] Inventors: Richard J. Dame, 307 Cambridge Ave., Syracuse, N.Y. 13208; Kenneth A. Immeke, Rensselaer, N.Y.

[73] Assignee: Richard J. Dame, Syracuse, N.Y.

[21] Appl. No.: 524,424

[22] Filed: Sep. 6, 1995

[51] Int. Cl.⁶ ............................................. H04M 11/04
[52] U.S. Cl. .............................. 379/37; 379/33; 379/51
[58] Field of Search ........................ 379/32, 33, 37, 379/46, 50, 51, 90, 44, 49, 42

[56] References Cited

U.S. PATENT DOCUMENTS

| | | |
|---|---|---|
| 4,148,020 | 4/1979 | Siemer et al. . |
| 4,262,283 | 4/1981 | Chamberlain et al. ............... 379/49 |
| 4,278,841 | 7/1981 | Regenmitter et al. . |
| 4,361,730 | 11/1982 | Barber et al. . |
| 4,390,750 | 6/1983 | Bartelink ............................ 379/42 |
| 4,465,904 | 8/1984 | Gottsegen et al. . |
| 4,654,640 | 3/1987 | Carll et al. . |
| 4,718,079 | 1/1988 | Rabito . |
| 4,731,810 | 3/1988 | Watkins . |
| 4,737,776 | 4/1988 | Wireman . |
| 4,825,457 | 4/1989 | Lebowitz . |
| 4,868,859 | 9/1989 | Sheffer . |
| 4,887,290 | 12/1989 | Dop et al. . |
| 5,185,779 | 2/1993 | Dop et al. . |
| 5,195,126 | 3/1993 | Carrier et al. ...................... 379/51 |
| 5,233,640 | 8/1993 | Kostusiak . |

*Primary Examiner*—Curtis Kuntz
*Assistant Examiner*—Stephen W. Palan
*Attorney, Agent, or Firm*—Schmeiser, Olsen & Watts

[57] ABSTRACT

A security system backup device which provides a system that recognizes when an outdoor telephone line near the building has been severed and provides a means by which a distress message can be sent over the operable part of the outdoor telephone lines. The system utilizes a signal generator connected to a phone line inside of the building and a signal detector connected to the outdoor phone line outside of the building in a discreet and hard to reach location. When the signal no longer appears on the line, a telephonic calling unit, which is located with the signal detector, places a distress call.

17 Claims, 2 Drawing Sheets

ALARM SYSTEM BACKUP WITH CUT LINE DETECTOR

FIELD OF THE INVENTION

The present invention relates generally to alarm systems. In particular, the present invention is concerned with a backup alarm system to protect against telephone line severance.

BACKGROUND OF THE INVENTION

Currently, there are numerous alarm systems on the market. Many of these systems operate in conjunction with protective service companies. Generally, these companies act as monitoring stations in the event an alarm is triggered at a remote location. Typically, the alarm system will automatically place a telephone call to a protective service company thereby placing them on notice that a breach of security has occurred. The protective security company then acts appropriately by either sending help or notifying the police.

Unfortunately, the criminal element in today's society has sought ways of undermining this technology. One such way they have done this is to cut the telephone lines going into a building just prior to breaking in. The protective service company is therefore unable to respond since they are unaware of the break in.

In order to avoid this problem, alarm systems have been developed to include alternate or redundant methods of notifying protective service companies. For instance, U.S. Pat. No. 4,361,730 to Barber et al. discloses a system which utilizes interactive cable television lines as a means of reporting a break in.

U.S. Pat. No. 4,731,810 to Watkins discloses a backup security system which utilizes a.c. power lines as a means for transmitting an alarm if the phone lines have been cut.

U.S. Pat. No. 4,465,904 to Gottsegen et al. discloses an alarm system which utilizes a radio transmitter as a backup device in the event of line severance.

Finally U.S. Pat. No. 4,887,290 and 5,185,779 to Dop et al. disclose cellular alarm backup systems for use with standard alarm systems in the event the telephone line is severed.

Although each of the above patents attempts to provide a possible solution to the problem, each one has the drawback of being relatively expensive due to the fact that an additional or redundant transmission means is required which utilizes something other than the existing telephone line.

Until now, no system exists which uses the existing cut telephone lines at a point where they are still operable to notify the security company that the lines have been cut. The present invention seeks to provide this functionality.

Each of the above listed patent are hereby incorporated by reference.

SUMMARY OF THE INVENTION

Briefly, the present invention is a backup alarm system that utilizes a signal generator connected to an interior phone line to generate a high frequency signal out to the outdoor telephone line. On the outdoor line, in a discreet location, a signal detection device monitors the signal. If the signal ceases, thereby indicating a break in the line between the signal detection device and the building, a telephonic calling unit located in conjunction with the detection device automatically places a distress call.

The invention may include a line switching device to deselect the house and select the telephonic calling unit. It may also include a line filter placed above the detection device to remove the signal from the telephone lines before it reaches the telephone company service line. In addition, the invention may include a cellular or radio backup device.

In accordance with the above, it is an object of the present invention to provide a backup alarm system to warn of telephone line severance.

In accordance with the above, it is a further object of the present invention to provide a system which utilizes the severed phone line to place a distress call.

In accordance with the above, it is a further object of the present invention to provide a detection device which can determine whether the phone line has been cut at points near where the outdoor telephone line enters the building.

In accordance with the above, it is a further object of the present invention to provide an inexpensive means for modifying existing alarm systems to include this functionality.

In accordance with the above, it is a further object of the present invention to provide a system that is easily installable to existing phone lines.

BRIEF DESCRIPTION OF THE DRAWINGS

These and other advantages of the present invention become more readily apparent upon reading the following detailed description and upon reference to the drawings in which.

DETAILED DESCRIPTION OF THE PREFERRED EMBODIMENTS

Figure 1:
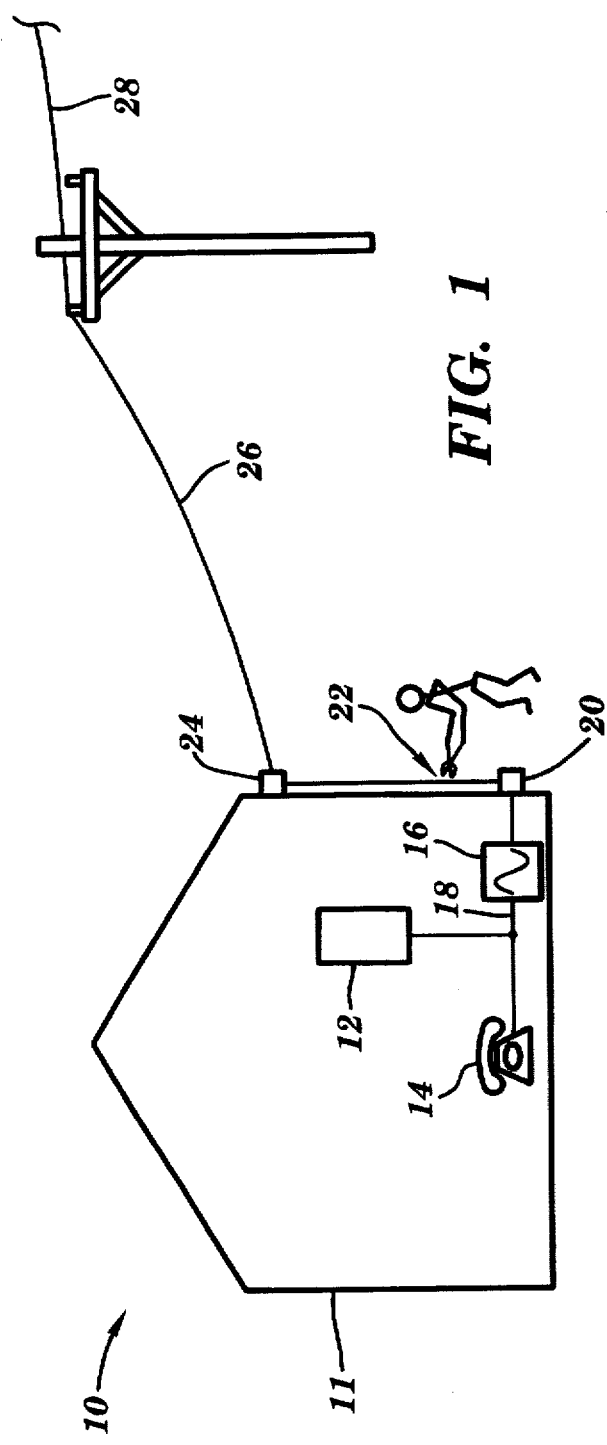
FIG. 1 depicts a schematic illustration of a typical application of the present invention.

Referring now to the drawings and more particularly to FIG. 1, a typical application of how this invention operates is shown 10. Inside of building 11 there exists an interior phone line system 18, at least one telephone 14 and an alarm control and communication unit 12. This is representative of most alarm systems today in that should the unit 12 detect an alarm, a message is transmitted via the phone lines to a protective service company.

The present invention however provides a backup system by adding a signal generator 16 and a signal detection/telephonic transmission unit 24. Thus, if a burglar cuts the outdoor phone line 26 at a point 22 near the outdoor terminal block 20 (i.e., the point at which the phone line enters the building), the status signal generated by the signal generator 16 is no longer detected by the signal detection/telephonic transmission unit 24. When this occurs, the signal detection/ telephonic transmission unit automatically dials and transmits a distress call to the protective service company. This can be accomplished since the unit 24 still has access to the telephone company service lines 28 via the unaffected portion of outdoor telephone line 26.

For maximum effectiveness, it is ideal to place unit 24 in a discreet position, preferably as high up as possible so that a potential burglar will not notice it and/or be tempted to cut the phone line before the unit 24. It is also understood that this system could be used in situations where the outdoor phone lines are run underground by placing unit 24 away from the building, perhaps hidden in a bush or the like. Unit 24 may be powered by the phone lines themeselves, a battery, or a.c. power.

Figure 2:
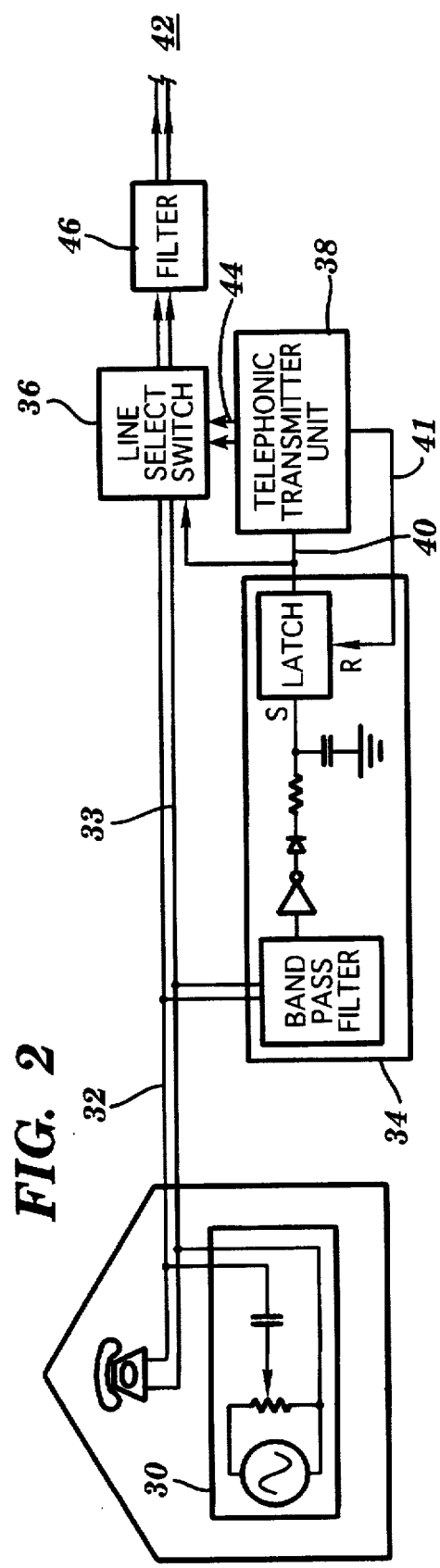
FIG. 2 depicts a high level schematic of the hardware in accordance with the present invention.

Referring now to FIG. 2, a high-level hardware schematic diagram is shown. Signal generator 30 is shown inside a building and connected to the interior portion of phone line 33. The signal generator may comprise a signal generation device which generates a continuous status signal ideally at a constant frequency of between 20 and 50 kilohertz. It is understood however that this range may vary depending on the required parameters of the phone system and the present invention. The signal may also comprise any type of signal including a sine wave or a square wave. It is also understood the signal need not be a continuous signal, but may be a pulse type signal. The status signal will ideally have a tone level of approximately 0.1 volts, however any acceptable voltage level may be used.

The signal, once generated, travels outside the house along telephone lines 33. Signal detection device 34 monitors the line 33. As shown, the detection device 34 comprises a bandpass filter to listen specifically for the status signal, an amplifier to boost the signal, a rectifier to convert the signal into d.c., a resistor and a capacitor to hold the charge on the line. An alternative design which utilized an oscillation device, rather than a filter, could also be used to detect the signal. The device 34 also utilizes a latch which will turn on (or off, depending upon the design) line 40 when the status signal is no longer present. This condition will exist when the telephone line 33 has been cut near point 32.

It is also envisioned that signal detection device 34 could also comprise a sensing device which would simultaneously monitor the phone line to detect a short circuit. It could also incorporate a voltage sensor to make certain that phone service from the telephone company service lines was operational. If either of these failure conditions existed, a cellular phone or some other means could be utilized to place the distress call.

Line 40, once turned on, will in turn cause line select switch 36 to deselect the telephone lines going to the building and select telephone lines 44 which lead to a telephonic transmitter unit 38. Line select switch 36 may incorporate a single relay or double relay system to eliminate problems related to short circuits. An RF trap may also be placed on the telephone line near the line switch to remove any unwanted radio frequency noise.

Once the line switch has occurred, telephonic transmitter unit 38 becomes enabled, listens for a dial tone, and then places a call to the desired location (e.g., a protective service company). This call takes place over outdoor line 33 which is connected to the telephone company service lines at 42. Telephonic transmitter 38 may comprise any of the standard electronic phone devices presently known in the art such as those produced by UNISONIC PRODUCTS or YES! ENTERTAINMENT CORPORATION. It may also comprise a data or voice message stored in EPROM or some other storage means. Telephonic transmitter unit 38 may also comprise a backup cellular phone or radio transmitter in the event a dial tone is unavailable.

In addition, a line filter unit 46 is also provided for. This unit will eliminate the status signal created by the signal generator 30 before it reaches the telephone company service lines 42. Furthermore, the filter unit 46 may also comprise a spark gap which will protect the aforementioned hardware from electrical spikes.

Finally, line 41 is provided for to reset the system. This may occur after a call or several calls have been placed, or may be reset manually.

It is recognized that the aforementioned description is only one of many possible ways of implementing this invention. For instance, the detection device 34 may monitor for time spaced pulses rather than a continuous signal. Moreover, the status signal may be sent over one or both of the phone line wire pair. Additionally, the transmitter unit 38 may have the capability of listening for a response after it has transmitted its information so that the system can then react accordingly.

Furthermore, it is also possible to add optional security devices to this invention. For example, indoor panic buttons may be incorporated which utilize the signal generator and detection device. One such method of accomplishing this would be to have the panic button remove the status signal from the phone line, thereby creating the necessary condition for sending a distress call. This could easily be accomplished with the use of a switch and capacitor placed in parallel with the phone line.

Figure 3:
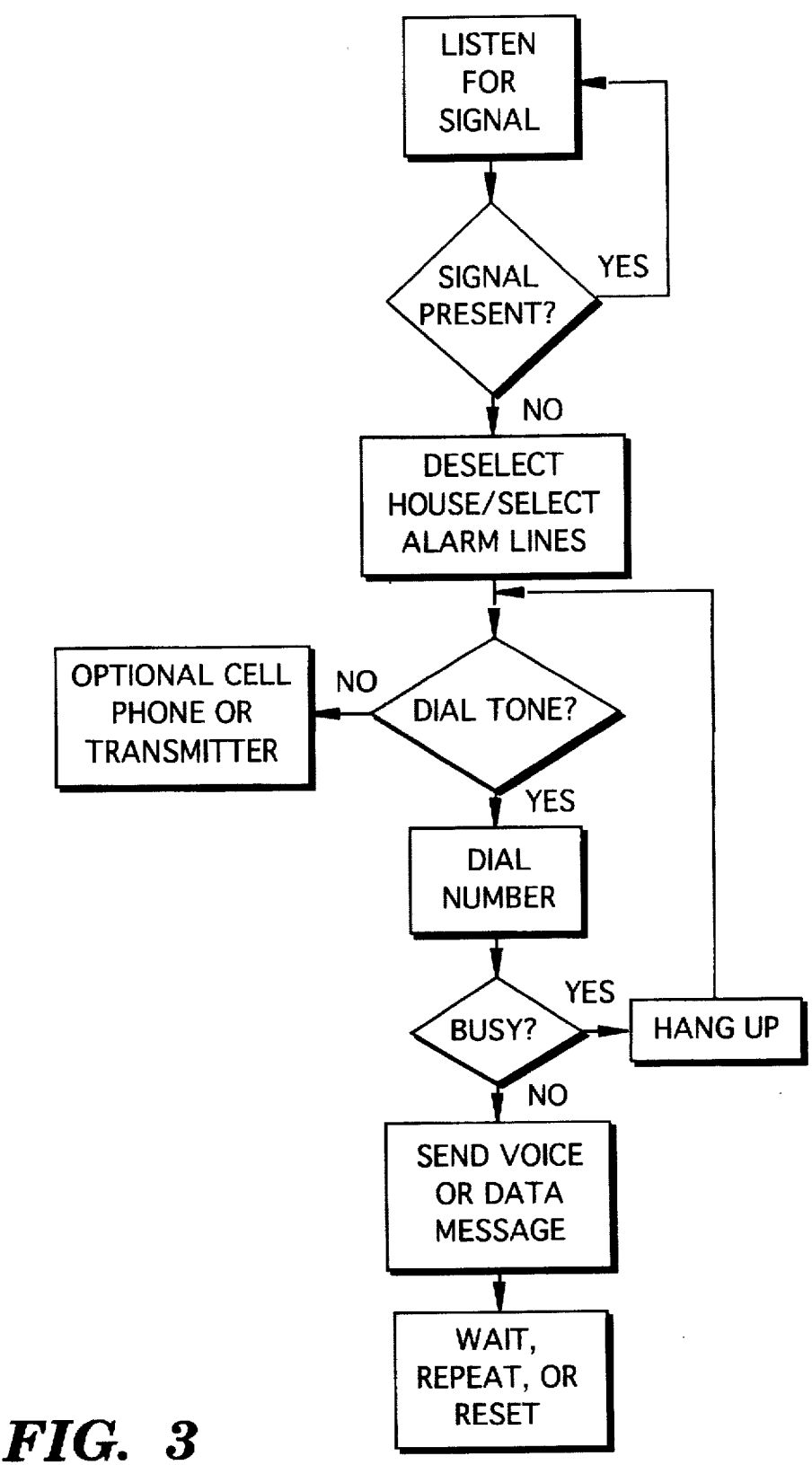
FIG. 3 depicts a logic diagram in accordance with the present invention.

Referring now to FIG. 3, a logic diagram is shown which depicts how the signal detection unit 34, the telephonic transmitter 38, and the line select switch 36 of FIG. 2 may operate.

Signal detection device 34 continuously listens for the status signal. As long as the signal is present, the outdoor telephone lines are operable and the system holds in this pattern. If the signal is not present, the line select switch 36 deselects the house telephone lines and selects the alarm telephone lines.

The telephonic transmitter unit 38 then listens for a dial tone. If the tone is not present, the system can optionally switch to a cellular phone or radio transmitter as a means of calling for help. If there is a dial tone, the telephonic transmitter unit 38 dials the appropriate telephone number. If the number is busy, it hangs up and tries again. This will be repeated until the line is no longer busy.

Once a connection has been established, a pre-recorded voice or data message is transmitted over the phone lines. After this is done, the system may be set to do a number of things such as wait for a response, repeat the message, or hangup and reset the system.

The foregoing description of the preferred embodiments of the invention have been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

We claim:

1. An impaired telephone line warning system comprising:
   a signal generation device operably connected to an interior telephone line, wherein said signal generation device includes a mechanism for status signal over said interior telephone line to a distally connected outdoor telephone line that runs from a building containing said interior telephone line to a telephone company service line;
   a signal detection device operably connected to said outdoor telephone line, wherein said signal detection device includes a mechanism for detecting said status signal; and
   a telephonic calling unit operably connected to said outdoor telephone line and to said signal detection device, said calling unit including a mechanism for dialing out and transmitting a warning message over said outdoor telephone line.

2. The warning system of claim 1 further comprising a line select switch, said line select switch capable of disabling telephone service along said outdoor telephone line leading to said interior telephone line.

3. The warning system of claim 1 further comprising a filter operably connected to said outdoor telephone line, said filter suitable for eliminating said status signal.

4. The telephonic calling unit of claim 1 wherein said unit comprises a dialing apparatus for dialing at least one preset telephone number.

5. The telephonic calling unit of claim 4 further comprising a redialing apparatus for redialing one of said at least one preset telephone numbers.

6. The telephonic calling unit of claim 1 wherein said unit comprises a transmission device capable of transmitting a stored data stream.

7. The telephonic calling unit of claim 1 wherein said unit comprises a transmission device capable of transmitting a prerecorded message.

8. The warning system of claim 1 further comprising a spark gap.

9. The warning system of claim 1 further comprising a cellular backup transmitter for use in the event said telephonic transmission device fails.

10. The signal generation device of claim 1 wherein said generated status signal is a continuous sinusoidal signal above 20 kilohertz.

11. A telephone security system comprising:

an indoor telephone line system;

an outdoor terminal block operably connected to said indoor telephone line system;

an outdoor telephone line connecting said outdoor terminal block to a telephone company service line;

a signal generation device installed along said indoor telephone line system, said signal generation device capable of generating a status signal to said outdoor terminal block and along said outdoor telephone line;

a signal detection device electrically coupled in series with said outdoor telephone line, said signal detection device capable of sensing said status signal; and a telephonic transmitter unit installed along said outdoor telephone line, said unit capable of dialing and transmitting telephone data via said outdoor telephone line to said telephone company service line.

12. The telephone security system of claim 11 further comprising a line select switch, said line select switch capable of disabling access to said outdoor terminal block and enabling access to said telephonic transmitter unit.

13. The telephone security system of claim 11 further comprising a filter suitable for removing said status signal from said outdoor telephone line before said status signal reaches said telephone company service line.

14. A backup alarm system comprising:

a detection device connectable to an outdoor telephone line at a first point distally away from a building receiving telephone service via said outdoor telephone line, said detection device having a mechanism for detecting a break in said telephone line anywhere between said detection device and a point at which said outdoor telephone line enters said building; and a telephonic transmitter unit connectable to said outdoor telephone line and proximately located near said detection device, said unit including a mechanism for dialing and transmitting data along a telephone company service line via said outdoor telephone line.

15. The backup alarm system of claim 14 further comprising a signal generation device connectable to an interior telephone line, said signal generation device providing a status signal readable by said detection device.

16. The backup alarm system of claim 14 further comprising a line select switch connectable to said outdoor telephone line.

17. The backup alarm system of claim 14 further comprising a filter connectable to said outdoor telephone line at a fourth point anywhere between said detection device and said telephone company service line.

\* \* \* \* \*